Figure 5:
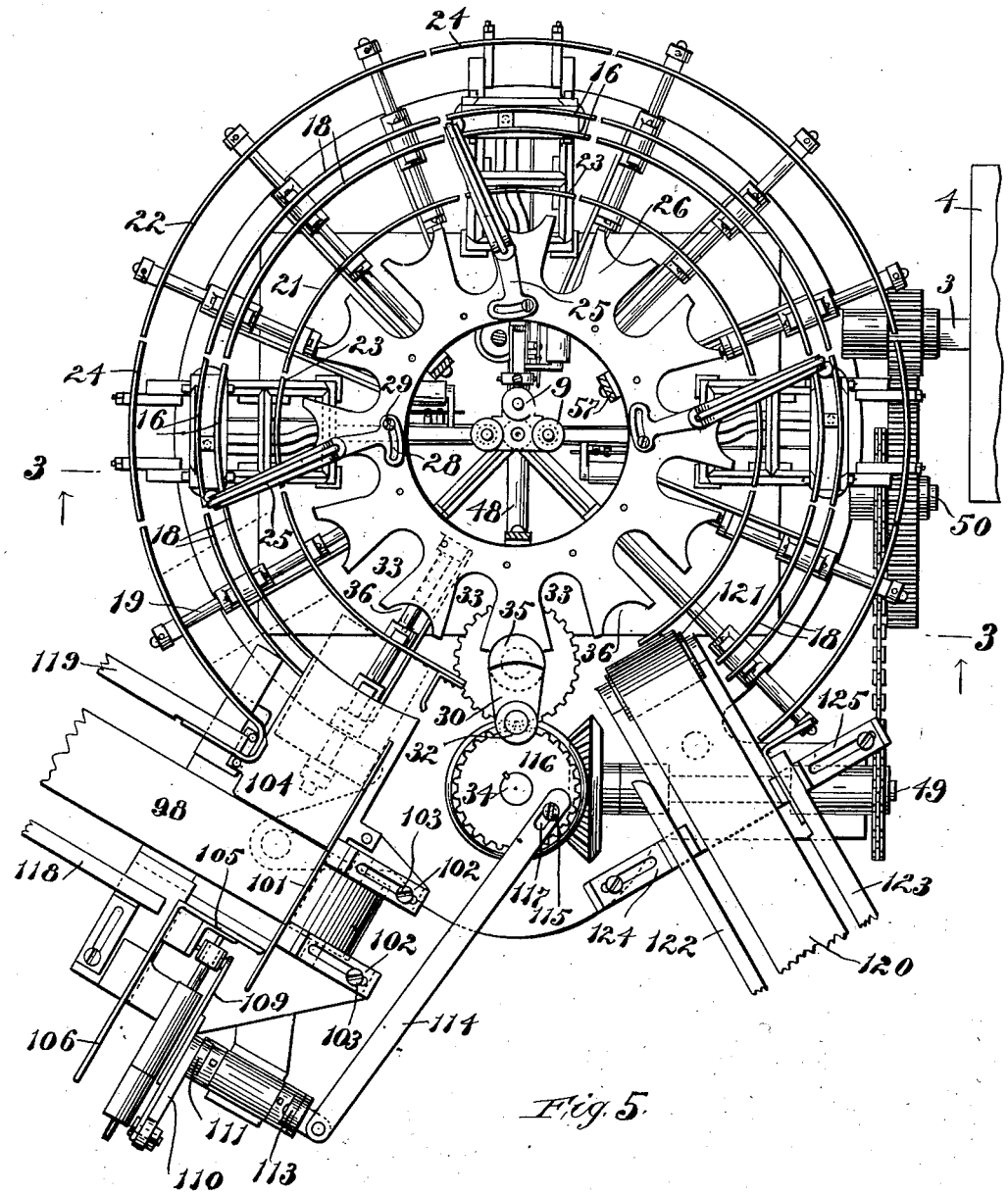

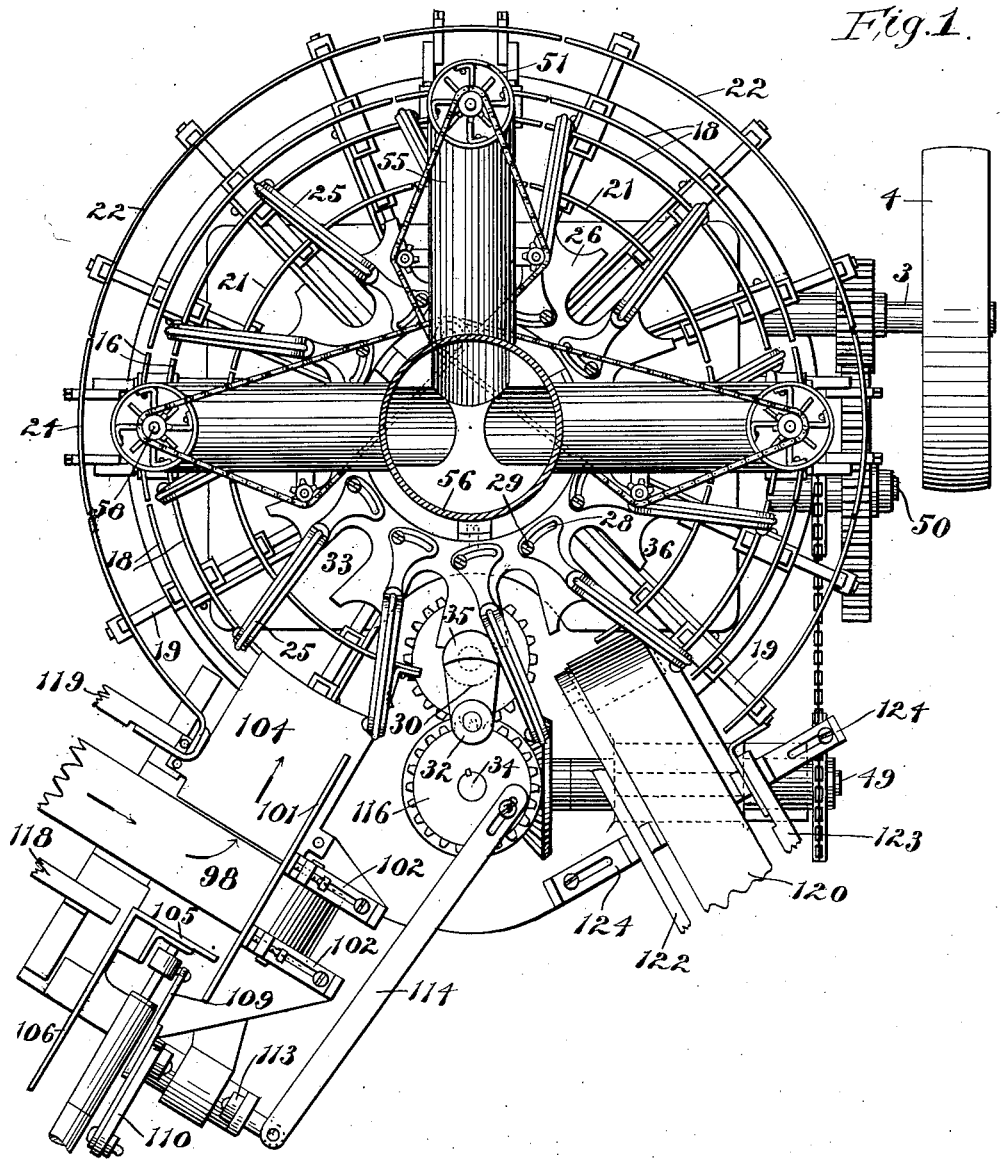

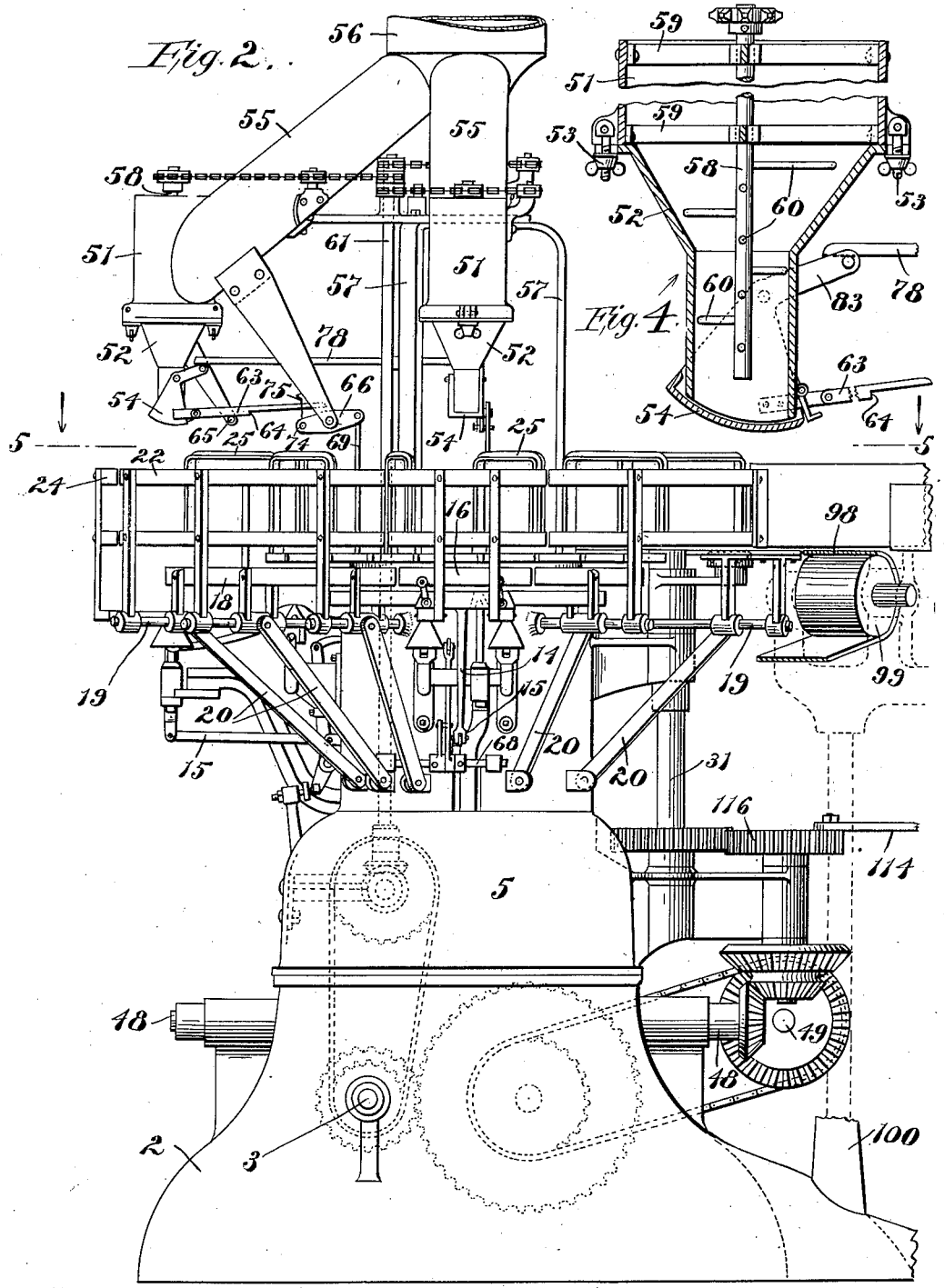

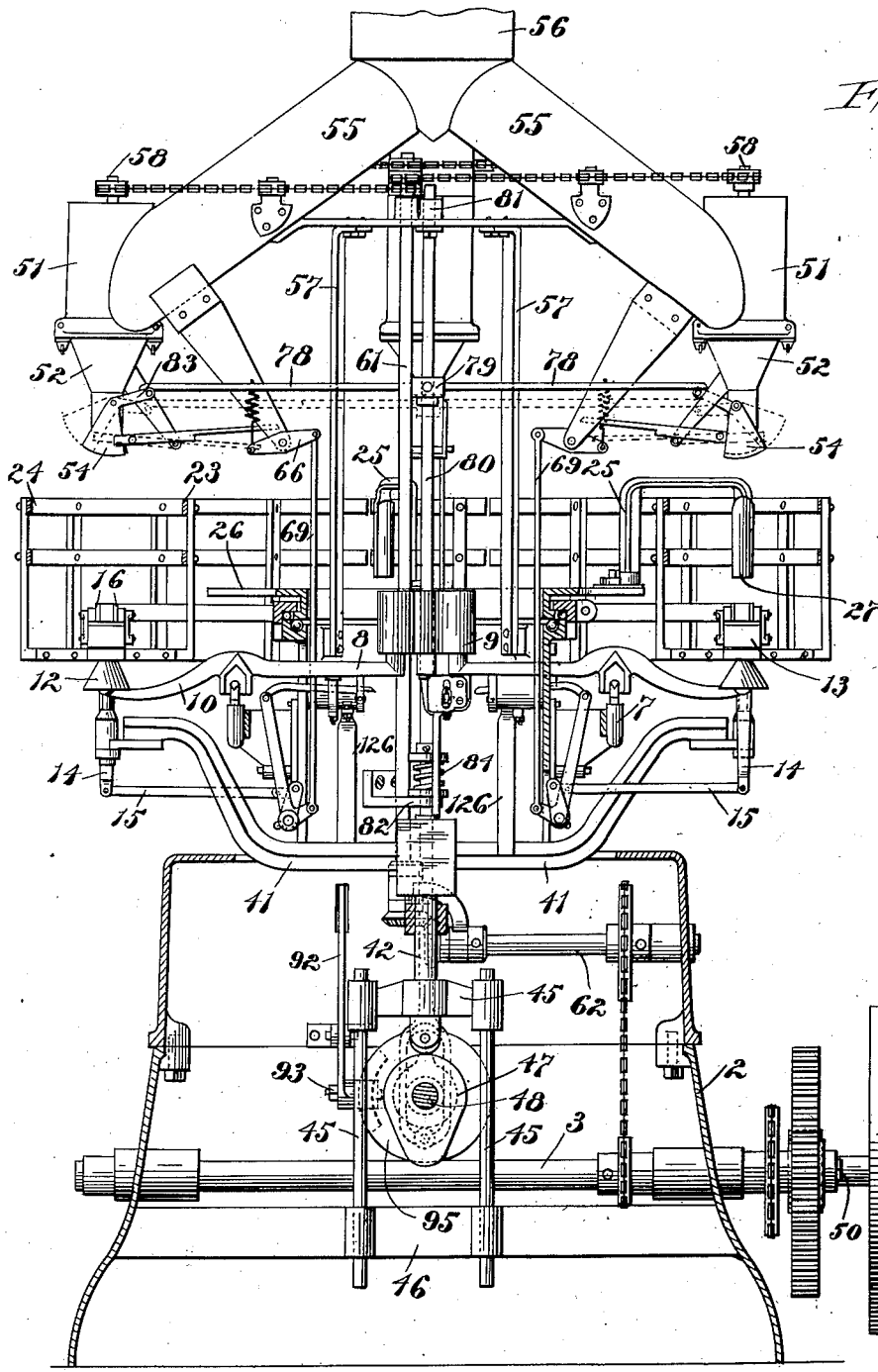

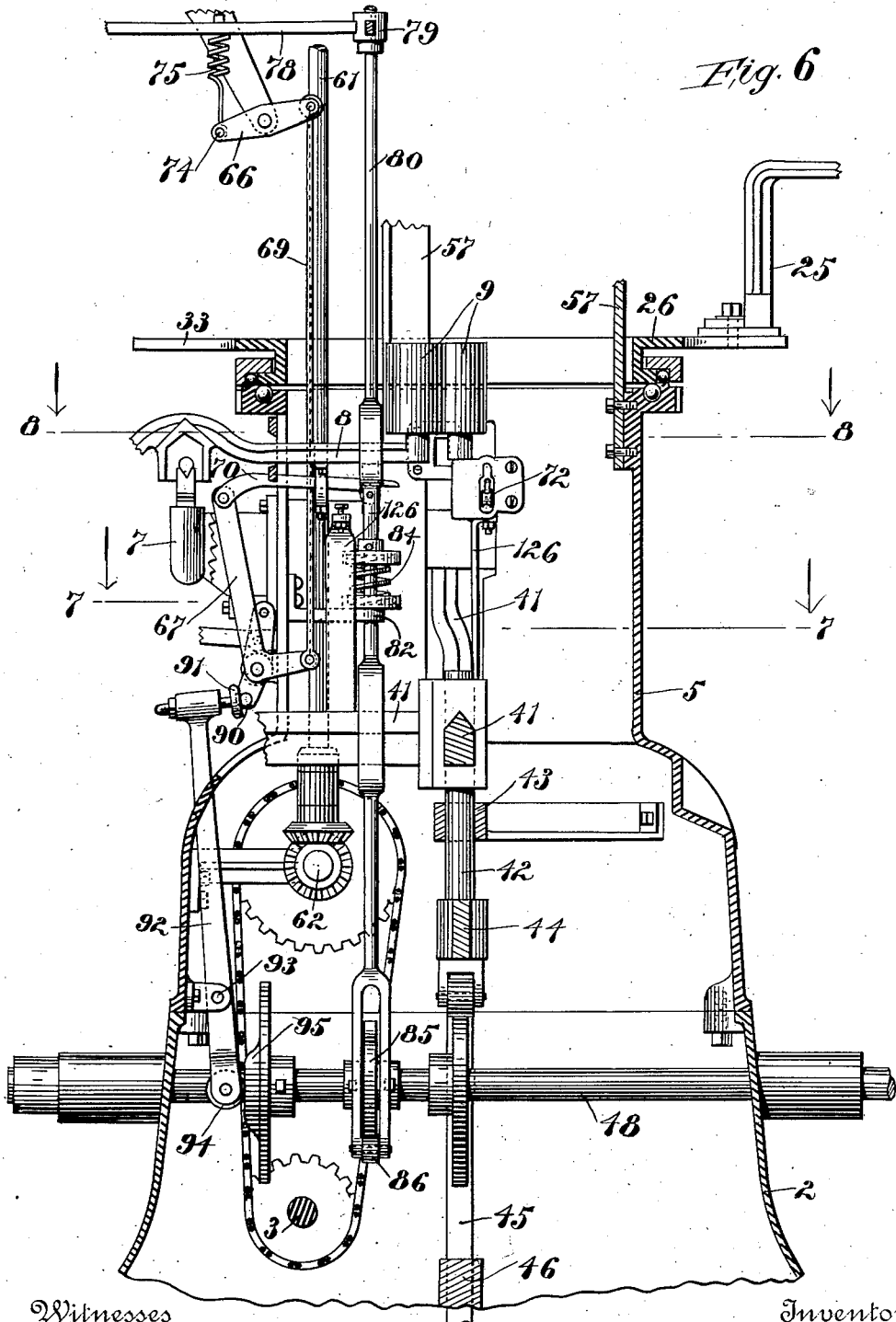

E. G. TREMAINE.
AUTOMATIC WEIGHING APPARATUS.
APPLICATION FILED NOV. 30, 1906.
1,070,306.
Patented Aug. 12, 1913.
8 SHEETS—SHEET 6.
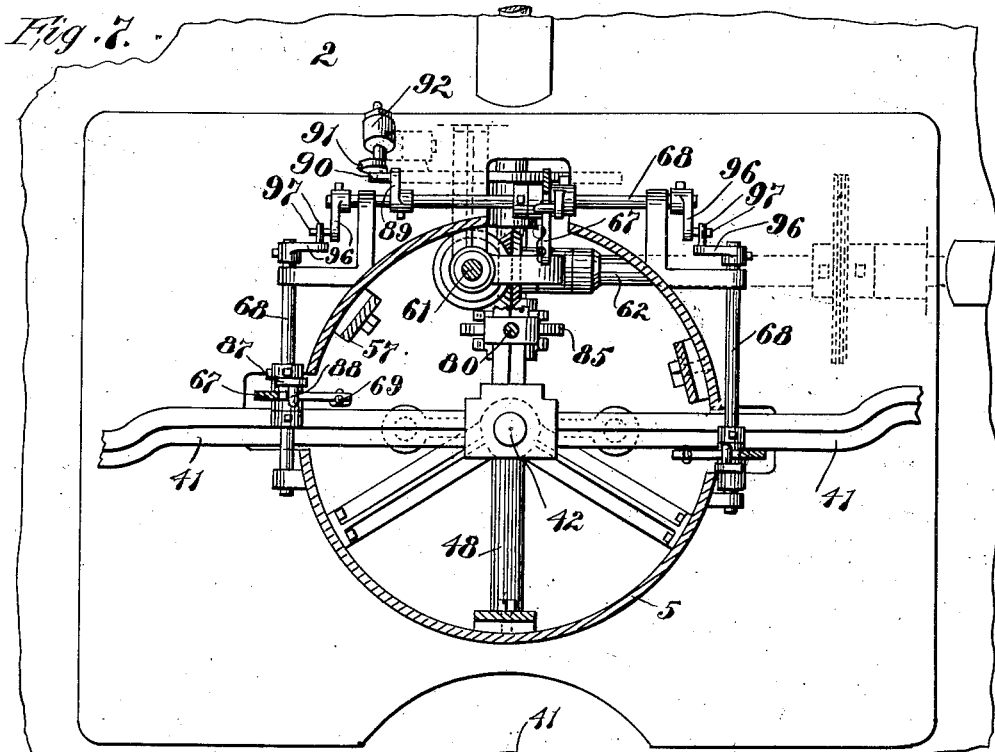
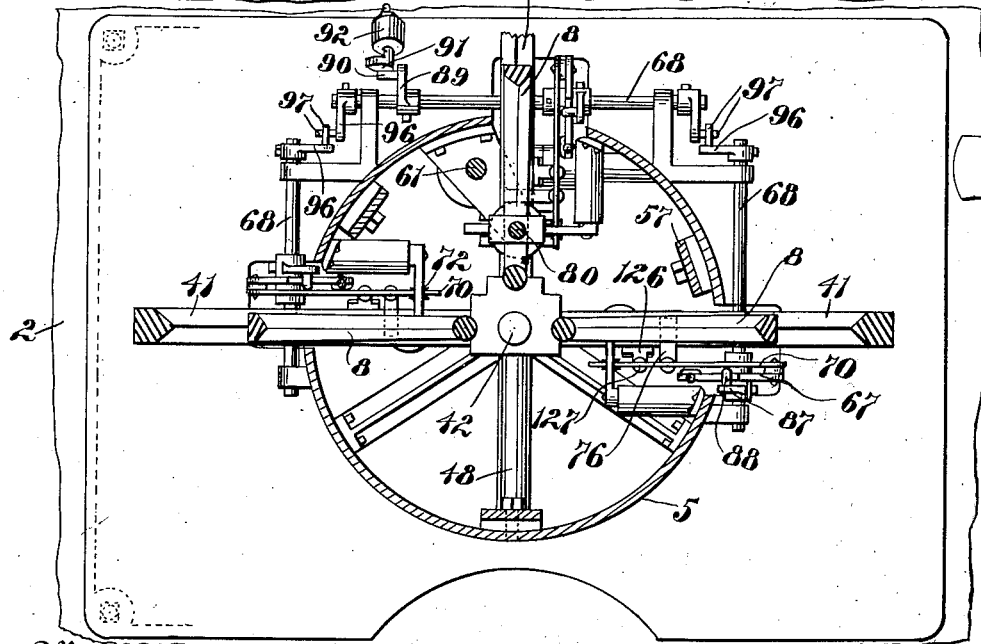

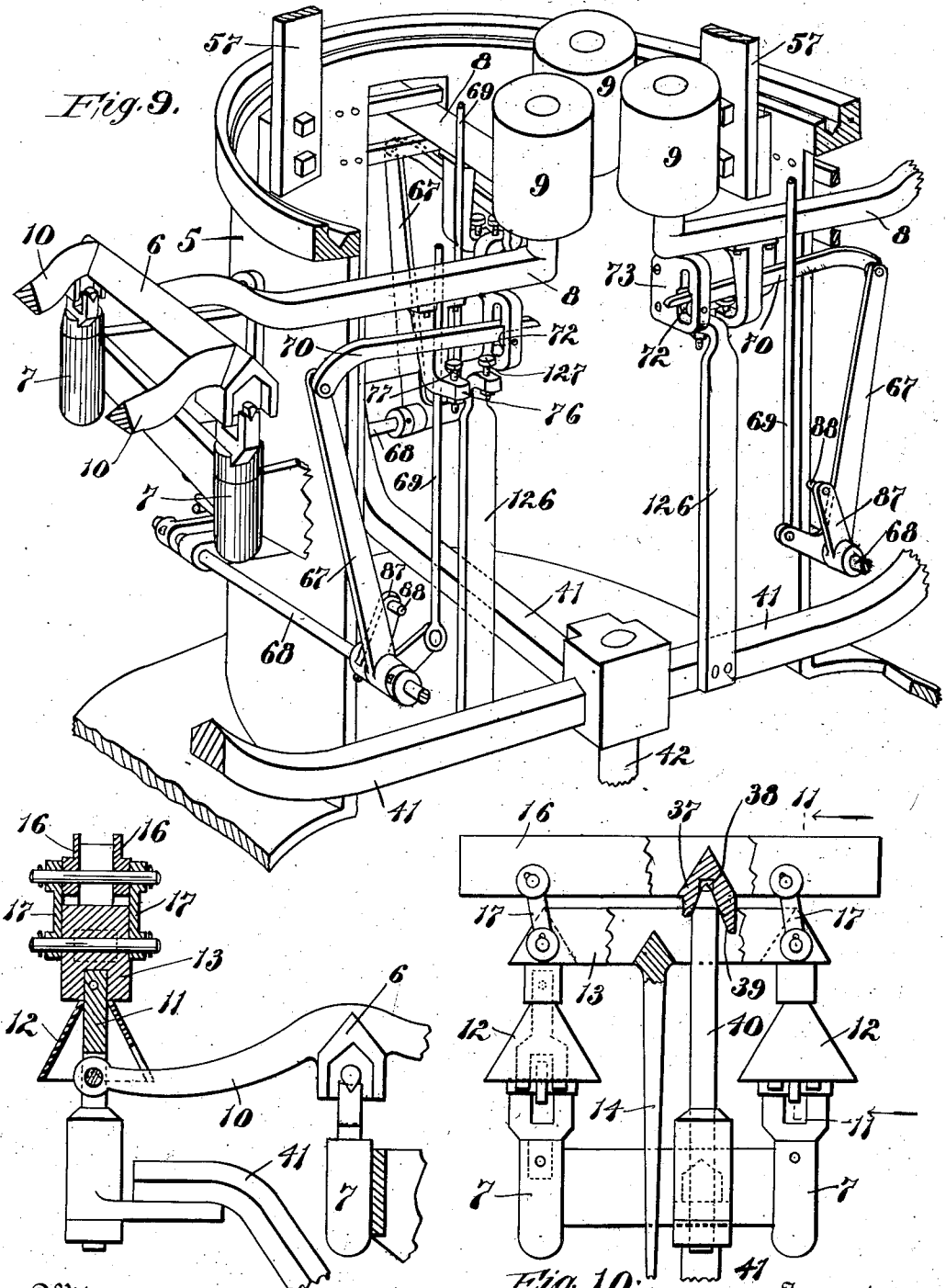

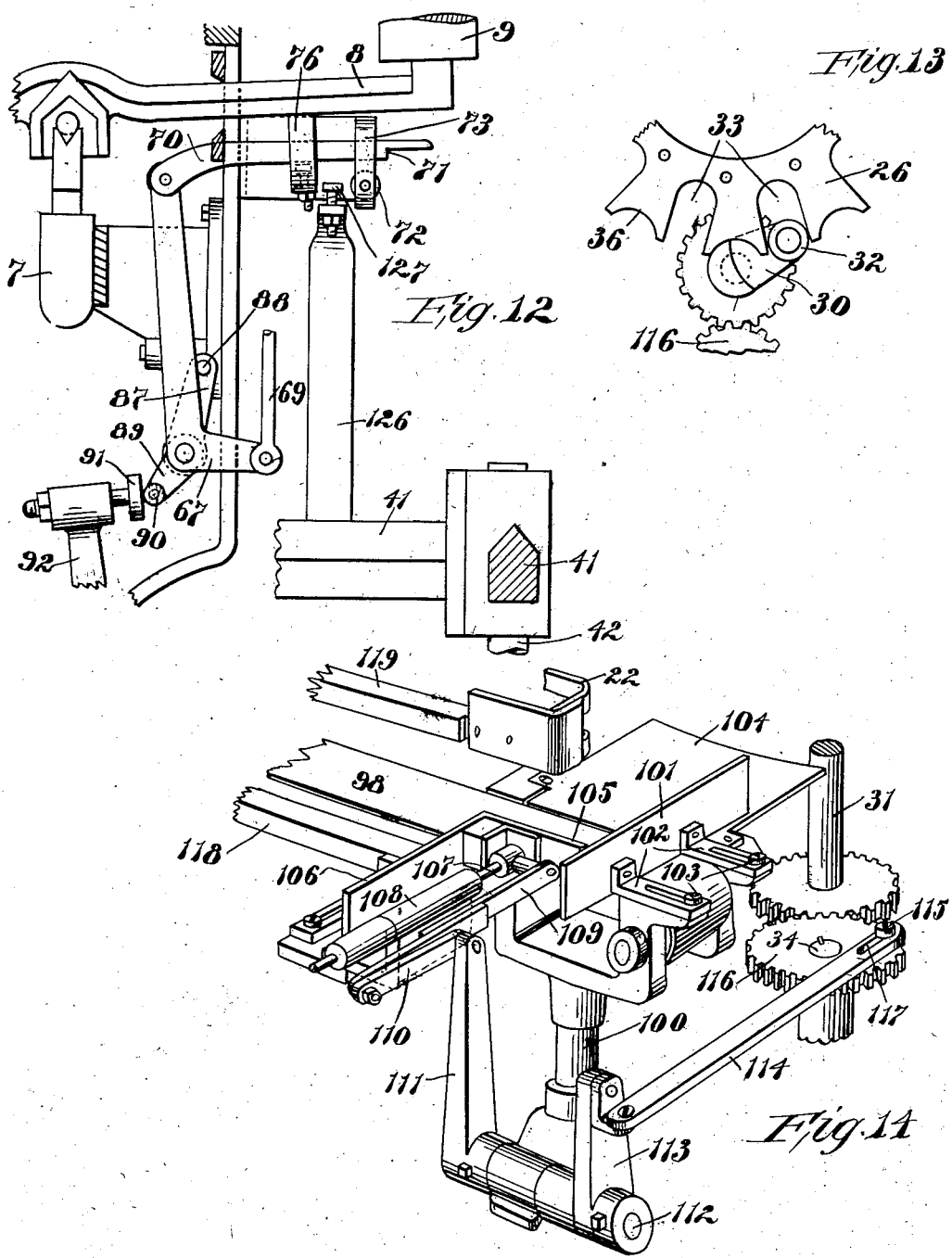

UNITED STATES PATENT OFFICE.

EDWARD G. TREMAINE, OF HACKENSACK, NEW JERSEY, ASSIGNOR TO AUTOMATIC WEIGHING MACHINE COMPANY, OF NEWARK, NEW JERSEY, A CORPORATION OF NEW YORK.

AUTOMATIC WEIGHING APPARATUS.

1,070,306.  Specification of Letters Patent.  Patented Aug. 12, 1913.

Application filed November 30, 1906. Serial No. 345,807.

*To all whom it may concern:*

Be it known that I, EDWARD G. TREMAINE, a citizen of the United States, and resident of Hackensack, in the county of Bergen and State of New Jersey, have invented certain new and useful Improvements in Automatic Weighing Apparatus, of which the following is a specification.

My invention relates more particularly to automatic weighing machines of that type in which the material being handled is weighed in the cartons or other receptacles in which it is to be put up, so that the apparatus serves also as a packaging machine and delivers gross weights. In machines of this type it has heretofore been customary, in order to secure rapidity of operation, to deliver an approximate load to each receptacle by a preliminary operation and to complete the load by a drip stream or the like while the receptacle is on the scale, and it is a main object of my invention to provide an automatic weighing apparatus which will be capable of operation at a considerably greater speed than the prior machines above referred to, without loss of accuracy in the weights obtained, to which end I provide two or more weighing devices and secure each desired quantity of material by means of a number of operations, all except the last of which result in depositing in the receptacle an approximate load, by weight, of the material being handled, while the last weighing operation completes the load through the agency of a drip stream. With this arrangement, since the amount of the approximate load is determined by weight, there can be no variation in this load through differences in specific gravity, rate of flow or the like, so that the margin between the approximate load and the final load can be made very small and a corresponding reduction of the time during which the drip stream has to flow can be secured without increasing the size of the drip stream beyond what it should be in order to insure the requisite degree of accuracy. While the drip stream is completing a load in one receptacle a previous receptacle may simultaneously receive a preliminary or partial load, and in order to render the machine capable of delivering and weighing an approximate load as rapidly as it completes a load by the drip stream, I prefer to obtain each approximate load through the medium of two or more distinct operations, one portion of said load being obtained by one of these operations and a subsequent portion by the next operation, and so on, and the last of these operations, at least, being a weighing operation. For example, in case there are two preliminary operations, each accomplished by means of a scale, two receptacles will receive partial loads of material simultaneously, with a corresponding reduction of the length of time required for delivering material to a receptacle on either of these preliminary scales. It is to be understood, however, that so far as my broad invention is concerned it is immaterial how the first portion of each load is delivered to a given receptacle, so long as the preliminary or approximate load is completed on a scale from which the receptacle is transferred to that scale to which the drip stream is supplied, the essential thing being that the delivery of the approximate load shall cease when a definite weight somewhat less than the full weight required shall have been obtained.

My invention also includes various other features and details of construction, all of which will be hereinafter set forth at length.

An apparatus embodying my invention in its preferred form is illustrated in the accompanying drawings, in which—

Figure 1 is a top plan view of the complete apparatus; Fig. 2 is a side elevation thereof; Fig. 3 is a front view, partly in elevation and partly in vertical section on the line 3—3, Fig. 5; Fig. 4 is a detail view showing one of the feed chutes and its valve in vertical section; Fig. 5 is a plan view of the parts located below the line 5—5 in Fig. 2; Fig. 6 is a central vertical section, from front to back, through the central portion of the machine, certain of the parts being shown in elevation; Figs. 7 and 8 are horizontal sections taken respectively on the lines 7—7 and 8—8 in Fig. 6; Fig. 9 is a perspective view illustrating the weighing scales in detail; Figs. 10 and 11 are sectional details showing certain features of the scales hereinafter described, the plane of section of Fig. 11 being indicated by the line 11—11 in Fig. 10; Fig. 12 is a side elevation illustrating the scale beam resetting mechanism; Fig. 13 is a plan view of a detail of the package feeding mechanism; and Fig. 14 is a perspective view illustrating an arrangement for automatically feeding cartons or other receptacles to the weighing apparatus proper.

In the apparatus herein represented three weighing mechanisms are employed, the arrangement being such that the material to be weighed is delivered to three receptacles simultaneously and to each receptacle in three successive portions or instalments, and means are provided whereby each receptacle is automatically placed upon and removed from the weighing mechanisms successively. Thus, referring to the drawings, 2 represents a fixed base or standard which is conveniently made hollow and supports the various moving parts of the apparatus, such of these parts as are operated by power being driven from a shaft 3 journaled in the base 2 and carrying a belt pulley 4 at its outer end. The upper portion 5 of the base 2 is preferably made detachable from the lower portion and carries the three weighing mechanisms, which are placed at suitable distances apart. That part of the apparatus which is represented at the lower portion of Fig. 1 is regarded as its front, and as thus regarded the weighing mechanisms are located one at each side and one at the back of the apparatus.

The three weighing mechanisms, as herein represented, have the same construction and mode of operation, so that it will be necessary to describe but one of them in detail. The construction is best shown in Figs. 3, 9, 10 and 11, in which 6 represents a scale beam supported by means of the usual knife edges on two posts 7 carried by the base piece 5, these posts and knife edges being located at a sufficient distance apart to give the scale beam the required stability. The inner end 8 of the beam 6 extends through an aperture formed in the base piece 5 and into the hollow interior of the latter, where it is provided with the usual weighing weight 9, and at its outer end said beam comprises two arms 10 the free extremities of which are provided with alined knife edges on which rest two supports 11, each carrying a shield 12 which covers and protects the knife edge beneath it. The supports 11 are connected at their upper ends by a cross bar 13, and are maintained in a vertical position by means of a downwardly-extending arm 14 carried by the cross bar 13, the lower end of which arm is connected to the base piece 5 by means of a link 15 pivoted at its ends to said parts, thus providing a species of parallel motion which is common in apparatus of this character. As a part of the feeding arrangement hereinafter described, the cross bar 13 carries two parallel strips or bars 16 held at a suitable distance from each other and having their upper edges located in the same plane, which strips constitute track sections adapted to support a receptacle while it and its contents are being weighed. For a reason which will hereinafter appear, these track sections 16 are so connected with the cross bar 13 that the former are capable of moving a short distance in the direction of their length, this being accomplished in the construction illustrated by means of four equal and substantially parallel links 17 pivoted at their ends to said parts 13 and 16, as shown in Figs. 10 and 11.

According to the arrangement illustrated in Figs. 1 and 5, each receptacle passes from the front of the apparatus nearly around the central portion thereof in the positive or clockwise direction, resting upon each of the scales in turn during its transit. This is provided for by means of a horizontal track extending to and from the three scales in sequence and composed in part of the track sections 16 carried by the three scale beams, the remainder of the track consisting of stationary track sections 18 located in circumferential alinement with the track sections 16 and carried by radial arms 19 which extend outward from the base piece 5 and are supported near their outer ends by means of braces 20. The track as a whole thus has a substantially circular contour when viewed in plan, and terminates at each end at the front portion of the apparatus. The receptacles to be filled rest upon and slide along this track in series, and are prevented from leaving the same in a lateral direction by means of inner and outer guide rails 21 and 22 carried by the radial arms 19 and bent laterally to coincide with circles having the same center as the track sections 16 and 18. At the points where the weighing mechanisms are located these guide rails are preferably formed by inner and outer sections 23 and 24 which are carried by the respective scale beams and move therewith, thus avoiding any frictional resistance to the poising of the scale beams which might be caused by contact between the receptacles supported thereon and the guide rails in case the latter were stationary.

The feeding of the successive receptacles through the apparatus is accomplished, according to the construction illustrated, by means of a number of arms 25, each carried by a feed plate 26 mounted to rotate horizontally on the upper end of the base piece 5 and driven as hereinafter described. Each of these arms 25 extends over the inner guide rail 21 and thence downward into the space between the guide rails and above the track, as shown in Fig. 3, so that its rear end 27 is located in position to engage the rear side of a receptacle and push it forward along the track. The arms 25 are located at equal distances apart, a space sufficient to receive a receptacle being provided between any two successive end portions 27, and said arms are so arranged that three of them will operate simultaneously to push three receptacles onto or off from the three weighing mechanisms, as illustrated in Fig. 5, from which the remaining arms are omitted for the sake of clearness. In order to adapt this feeding arrangement to receptacles of various sizes, each arm 25 is preferably pivoted to the plate 26 and provided at its inner end with a curved slot 28 concentric with its pivot, through which slot a clamping screw 29 passes into the plate and serves to hold the arm in any desired position of adjustment. In the present instance twelve of these arms are provided and the plate 26 is given a step-by-step rotation, each movement being through an angle corresponding to the angle between two successive arms. This step-by-step rotation of the plate 26 is accomplished by means of a crank arm 30 secured to the upper end of a vertical shaft 31 journaled in brackets carried by the parts 2 and 5, Fig. 2, said crank arm being provided at its free end with a crank pin carrying a roller 32 adapted to enter any one of a series of twelve equidistant notches 33 cut in the outer edge of the plate 26 and thus to impart to said plate twelve successive partial rotations when the shaft 31 is rotated continuously. Said shaft 31 is geared to a countershaft 34 which is driven as hereinafter set forth, and for locking the plate 26 against movement during the periods when the roller 32 is out of engagement therewith, the upper side of the crank arm 30 may be provided with a segmental projection 35 located opposite the roller 32 and adapted to enter in succession each one of a series of conforming notches 36 formed in the edge of the plate 26, midway between the notches 33 respectively.

It will be evident that each receptacle, while located on the track, will normally be in contact with that arm 25 by which it is pushed forward along said track, and if such contact were permitted while a receptacle was resting upon a scale beam a certain amount of frictional resistance to the poising of such scale beam would be developed thereby, which would interfere with the accuracy of the weighing operation. It is for the purpose of avoiding this interference that the track sections 16 are so mounted on the respective scale beams as to be capable of a slight longitudinal movement, as hereinbefore explained, these movable track sections being so operated that whenever a receptacle is about to be pushed onto the track sections carried by any one of the scale beams, said sections are moved longitudinally toward the approaching receptacle and then receive the same, whereupon they move in the opposite direction and carry the receptacle forward and away from the arm 25 by means of which it has just been pushed upon them, said receptacle being thus left free and unencumbered during the weighing operation. This mode of operation of the track sections 16 may be secured in a variety of ways, but a simple arrangement for the purpose is that shown in Fig. 10, according to which said track sections are connected to the cross bar 13 by links 17, as previously described, and carry a block 37 having in its under side an upwardly-extending, substantially conical recess 38, said block being formed to provide a continuation 39 of the slanting surface bounding that side of said conical recess which is nearest the advancing receptacles, which is the right hand side in Fig. 10 as the parts are therein shown. Beneath said block 37 is located a rod 40 carried by a vertically movable arm 41 and having its upper end made conical to correspond with the recess 38, said parts being so arranged that when the arm 41 is raised the upper end of the rod 40 will engage the slanting surface 39 and thereby force the block 37 rearward or toward the line of advancing receptacles, and with it the track sections 16, until the conical end of said rod is seated within said recess. This rearward movement of said sections 16 is permitted by the links 17, which links normally incline to the left from their lower ends as shown in Fig. 10, so that said rearward movement of the sections 16 is accompanied by an upward movement thereof which brings their upper edges into the same plane with the upper edges of the stationary track sections 18. The position of maximum elevation of the track sections 16 is determined by the seating of the conical end of the rod 40 in the recess 38, whereby also said track sections are locked in this position, the links 17 being still sufficiently inclined in the same direction to cause said track sections to fall forward and downward when permitted to do so. While the track sections 16 are in this position of maximum elevation a receptacle is pushed onto them, the next preceding receptacle being simultaneously pushed off said sections, and the arm 41 is then lowered, carrying with it the rod 40 and withdrawing the upper end of the latter from the recess 38, whereupon the weight of the track sections and the receptacle resting upon them causes said track sections to move forward and downward until such movement is arrested by their coming in contact with the cross bar 13. Since all these scale beams receive receptacles simultaneously, the arms 41 corresponding to these three scale beams may be raised and lowered simultaneously, to which end they are rigidly secured to the upper end of a rod 42, Figs. 6 and 9, which is mounted to slide vertically in a guide 43 carried by the base 2 and is provided at its lower end with a cross head 44 carrying two guiding rods 45 also mounted to slide vertically in a fixed cross brace 46, Fig. 3. This cross head 44 and the parts carried thereby are elevated at the proper times by means of a cam 47 carried by a shaft 48 passing through the base 2 from front to rear and geared to the countershaft 34, Fig. 2, which in turn is driven by a countershaft 49, the latter countershaft being driven from another countershaft 50 geared to the main driving shaft 3. The weight of the rod 42 and connected parts causes the same to drop whenever such movement is permitted by the cam 47.

Above each of the weighing mechanisms is located a chute or spout adapted to deliver material to the successive receptacles while they are located upon the corresponding scale beams, said chutes being provided with suitable valves or the like for controlling the delivery of the material. All three of these chutes and their valve mechanisms may conveniently have the construction illustrated in Figs. 2 and 4, in which one of the chutes is represented as composed of upper and lower portions 51 and 52 detachably secured together by means of pivot bolts and thumb nuts 53, the portion 52 having an open lower end controlled by a swinging cut off or valve 54 pivotally mounted on the sides of the chute and adapted to close by gravity. As herein represented, each chute is supplied with material through a connecting pipe 55 leading from a central bin or receptacle 56, these parts being suitably supported by uprights 57 bolted at their lower ends to the inside of the base piece 5. When the nature of the material operated upon requires it, the free delivery of this material may be secured by means of a suitable stirring device such as a vertical rod 58 located within its chute and journaled in fixed cross braces 59, the lower portion of said rod being provided with outwardly extending pins 60 adapted to project into and agitate the material contained in the chute upon the rotation of the rod 58. This rotation is effected by providing the upper end of each rod 55 with a sprocket wheel and connecting the latter with a corresponding sprocket wheel mounted on a vertical shaft 61, said shaft being journaled in the frame work of the apparatus and geared at its lower end to a countershaft 62 driven from the main shaft 3, Fig. 3. With this arrangement the rotation of the stirring devices is continuous, and the material is thus prevented from clogging or compacting within the delivery chutes.

Suitable means are provided for holding each of the valves 54 in its open position until the corresponding chute has delivered the required quantity of material to a receptacle beneath it, such means being represented as consisting in each case of a pivoted latch 63 carried by the valve and having a shoulder 64 adapted to engage behind a fixed pin 65 when said valve is opened to the desired extent. After having thus been opened any valve will evidently remain open until its latch 63 is tripped, and this tripping of the latch is caused to take place when the corresponding scale beam poises through suitable connections such as a pivoted lever 66, a bell crank lever 67 mounted to turn freely on a rod 68 and having one of its arms connected with one of the arms of the lever 66 by means of a link 69, and a latch arm 70 pivoted to the other arm of said bell crank lever and provided with a shoulder 71, Fig. 12, adapted to drop behind a roller 72 mounted on a fixed support 73, Fig. 9, adjacent to the corresponding scale beam. The support 73 may also serve as a stop to limit the downward movement of the weighted end of the beam. One arm of the lever 66 is provided with a pin 74 located in position to engage and lift the latch 63 when said lever is rocked, thus tripping said latch and permitting the closing of the valve 54, and for rocking said lever 66 a spring 75 is provided, which spring, when the parts are in the position shown in Figs. 3 and 9, tends to throw the corresponding latch arm 70 inward but is prevented from so operating by the engagement of the shoulder 71 on said latch arm with its roller 72. The weighted end 8 of the corresponding scale beam is provided with an arm 76 carrying an adjustable abutment herein shown as a screw 77, which is so located that when a predetermined weight is made on the scale beam and the weighted end of the latter rises said abutment 77 will engage the latch arm 70 and lift it until its shoulder 71 can pass by the roller 72, thus causing the instant closing of the valve as above explained.

Inasmuch as the receptacle-feeding mechanism delivers receptacles to all three scales at the same time, it is desirable to open all the valves 54 simultaneously, and also to do this at a predetermined instant with reference to the action of said feeding mechanism, rather than to control the opening of each valve by a movement of the corresponding scale beam. I have accordingly provided means for accomplishing this result, which means comprises three arms 78 rigidly secured at their inner ends to a hub 79 carried by a rod 80, said rod being mounted to slide vertically in suitable guides 81 and 82, Figs. 3 and 6, and the outer end of each of these arms being located above and in position to engage an extension 83 carried by the corresponding valve 54, so that upon the downward movement of said rod 80 and arms 78 the three valves will be opened simultaneously and latched as above described. The rod 80 is lifted by means of a spring 84, Fig. 6, whenever such movement is permitted, and is forced downward against the pressure exerted by said spring by means of a cam 85 carried by the shaft 48 and operating upon a roller 86 mounted in the bifurcated lower end of said rod, beneath the cam.

In addition to opening the valves 54 it is also necessary in the construction illustrated to reset the latch arms 70 after each operation of the three scales, and to this end the three rods 68, which are located respectively at the sides and rear of the base piece 5, as shown in Figs. 7 and 8, are mounted in suitable bearings and form rock shafts, each of said rock shafts being provided with an arm 87 carrying a pin 88 which is located in front of the upwardly-extending arm of the corresponding bell crank lever 67. The rock shaft located at the rear of the apparatus is also provided with an arm 89 carrying a pin 90 located in position to be engaged by a push plate 91 adjustably mounted in the upper end of a lever 92, Figs. 6 and 12, which lever is pivoted at 93 to the base 2 and is provided at its lower end with a roller 94 located in the path of the cam face of a cam 95 carried by the shaft 48. As thus constructed, at a given point in the rotation of the shaft 48 the push plate 91 is forced forward and caused to rock the rear or intermediate rod 68 in such direction and to such an extent as to throw its latch arm 70 outward into its latched or set position shown in Fig. 6, and this movement of said intermediate rod 68 is caused to communicate similar movements to the other two rods 68 by means of suitable connections such as arms 96 carried by the adjacent ends of said rods 68 and provided with crossing pins 97, the pins carried by the intermediate rod 68 being located immediately beneath the other pins 97, as shown in Figs. 7 and 8, so that the rocking of the latter rod as above described serves to reset all the latch-arms 70 simultaneously. Immediately after this resetting of the latch arms has been accomplished the operative portion of the cam 95 passes out of engagement with the roller 94 and thus leaves the rods 68 free to move with the corresponding bell crank levers 67 and latch arms 70, or any of them, whenever one or more of said latch arms is tripped by the poising of the corresponding scale beam or beams.

In connection with the parts above described I have shown arrangements for automatically delivering empty receptacles upon the track 18 in advance of the first weighing mechanism and for removing the filled receptacles from the other end of the track. The mechanism for supplying the empty receptacles comprises an endless conveyer belt 98 passing over a horizontal drum 99 journaled in a fixed support or stand 100 and continuously driven in any suitable manner, the receptacles being placed upon this belt by an attendant at some convenient point and brought up thereby as fast as they are transferred to the track 18. At the delivering end of the conveyer belt 98 a stop is provided for arresting the receptacles, which stop preferably consists of a vertical plate 101 extending across the upper side of the belt, at right angles to the length of the latter, and provided with slotted arms 102 whereby it is supported on the stand 100 and made capable of adjustment in the direction of the length of the belt to accommodate receptacles of different sizes, being clamped in any desired position of adjustment by means of set screws 103 passing through the slots in its arms 102. A horizontal plate 104 extends from one edge of the belt 98 across the end of the track 18, in the same plane with said belt and track, and the empty receptacles which are brought up by the belt and arrested by the stop plate 101 are pushed successively along the plate 104 and in front of the track 18 by means of a push plate 105 mounted to reciprocate transversely across said belt in front of the stop plate 101, which push plate is preferably provided with a supplementary stop plate 106 extending rearward from that edge of the push plate which is nearest to the advancing line of receptacles. Thus when said push plate 105 is forced forward to transfer a receptacle to the track 18, the plate 106 prevents the succeeding receptacles from advancing until said push plate has been withdrawn beyond the line of receptacles, whereupon the next receptacle is brought forward against the stop plate 101 and in front of the push plate, in readiness to be transferred to the track 18. As herein represented the push plate 105 is supported and guided by a horizontal rod 107 attached to its rear face and mounted to slide in a guide 108 carried by the support 100, and is reciprocated by means of a link 109 pivoted at one end to the push plate and at its other end to another link 110 which in turn is secured to an arm 111 carried by a rock shaft 112, said rock shaft being also provided with another arm 113 connected by a link 114 to a crank pin 115 carried by the upper face of the gear 116 which drives the shaft 31 and is carried by the countershaft 34 above referred to. A slot 117 which receives the crank pin 115 causes a certain amount of lost motion in the operation of the link 114, as a result of which the push plate 105 has a slight dwell just before the beginning of each movement in either direction, so that after said push plate has been drawn back sufficient time is given for a receptacle to reach the stop plate 101, and after it has moved forward the receptacle in front of it is held against displacement until it has been engaged and started forward by one of the arms 25. Guide rails 118 and 119 are provided at the sides of the conveyer belt 98, the former guide rail being preferably adjustable laterally as shown in Fig. 5 to accommodate receptacles of different widths, and the front end of the other guide rail 119 is connected with the adjacent end of the outer guide rail 22 as shown in Figs. 1 and 14, thus confining the receptacles to their intended course at all times during their movement down the conveyer belt and along the plate 104 to the track 18.

The removal of the filled receptacles is provided for by means of a second conveyer belt 120 passing over a longitudinal drum 121 which is journaled in the framework of the machine at such a point that said belt passes across the delivery end of the track 18, immediately adjacent thereto and in the same plane therewith, said belt 120 being driven in any suitable manner in the proper direction to convey the receptacles placed upon it away from the machine to any desired point. The filled receptacles are successively pushed off the track 18 and onto the belt 120 by means of the feed arms 25 above described and are thence conveyed away by said belt, being guided in their movement and prevented fom falling off the belt by means of guide rails 122 and 123 extending along the sides of the belt at a suitable elevation and preferably supported for lateral adjustment by means of slotted arms 124 and 125, Figs. 1 and 5.

In operation, assuming that the driving shaft 3 is rotated continuously and that empty receptacles are continuously supplied to the belt 98, the rotation of the countershaft 34 periodically reciprocates the push plate 105 and thus delivers the receptacles in succession in front of the track 18 as above described. The gear 116 being of the same diameter as its intermeshing gear on the shaft 31, the feed plate 26 is given a partial rotation for each complete reciprocation of the push plate 105, these parts and their operating devices being so arranged that one of the arms 25 engages each receptacle just after it has been pushed forward by said push plate and carries said receptacle onto the track 18 and out of the way of the next succeeding receptacle. The weighing weights of the first two scale beams are so adjusted that each receptacle while on the first scale to be reached receives a partial load by weight, while each receptacle on the second scale, having already received an equal partial load, there receives an additional partial load, these two partial loads taken together being a little less than the total weight of material to be placed in the receptacle. At the same time the drip stream delivered to a receptacle on the third scale is completing the approximate load previously delivered to that receptacle while on the preceding scales, and the amount of opening of the several valves 54 is preferably so adjusted that each receptacle will remain upon each of the three scales during approximately the same time, or, in other words, will require about the same time to receive its intended quantity of material from each of the three delivery chutes, so that all the scale beams will poise at approximately the same instant. Since it is essential that each receptacle shall remain on the third or drip-stream scale until the exact load intended shall have been completed in said receptacle, it is necessary to provide against the premature removal of such receptacle from this scale, and this is accomplished in the present instance by so timing the speed of the moving parts that a sufficient length of time for the delivering of the several partial loads above referred to shall always elapse between the partial rotations of the feed plate 26. This arrangement has the advantage of simplicity over the controlling of the feeding of the receptacles by the operation of the third or drip-stream scale, and by properly adjusting the valves the delay involved in providing the necessary margin of time between the feeding operations may be made so small as to be unimportant. By way of security against the delivery of material after the removal of a receptacle from any scale, however, it is advisable to provide means whereby the delivery of material to the receptacles while on the scales will be shut off with certainty before each receptacle-feeding operation, and to this end I secure to each of the arms 41 an upwardly-extending post 126 carrying an adjustable abutment 127 so located that when said arms 41 are moved upward to elevate and lock the track sections 16, just prior to the removal of a set of receptacles from the respective scales, the abutments 127 will lift the corresponding latch arms 70 and thus permit the closing of the several valves 54, in case said latch arms or any of them have not already been lifted and the valves closed by the poising of the scale beams as above explained. When each receptacle is pushed onto the track sections 16 carried by any of the scale beams it finds said track sections firmly locked in elevated position by one of the rods 40, and immediately after a set of three receptacles have been so transferred to the scales said rods 40 are lowered, whereupon the receptacles fall slightly forward and thus clear themselves from contact with the corresponding feed arms 25. The valves 54 are then opened by a downward movement of the rod 80 and the material is delivered to the several receptacles simultaneously. After the predetermined interval has elapsed the rods 40 and arms 41 are again moved upward, thus lifting the track sections 16 and locking them in raised position and also insuring the closing of the valves as above explained, and thereupon the plate 26 is given another partial rotation and a new set of three receptacles is transferred to the scales, simultaneously with the removal therefrom of the next preceding set, the last receptacle carried by the track 18 being simultaneously pushed off the track and onto the belt 120, by which it is immediately conveyed away. During the feeding of the receptacle the cam 95 operates the lever 92 and thus sets the latch arms 70 in readiness for the succeeding weighing operations. Owing to the distance between the scales in the direction of the track 18, each receptacle, after it has received a partial load, will be stopped at intervals during its travel along the track and between the scales, thus affording the material an opportunity to settle in the receptacles, or to be shaken down or compacted by any suitable devices for that purpose if the nature of the material being operated upon requires it.

It is to be understood that my invention is not limited to the employment of two weighing mechanisms for obtaining a preliminary load, so long as said load is weighed before it is transferred to the scale on which it is completed, and it will also be understood that other forms of weighing mechanisms may be substituted for the particular form herein shown and described, and that the various other features of construction and arrangement may be widely varied without departing from my invention.

I claim as my invention:

1. An automatic weighing apparatus comprising a scale adapted to support a receptacle, means for securing and controlling the delivery of material to said receptacle while on the scale, means for delivering to the receptacle, prior to its reception upon said scale, successive quantities of material the combined weight of which is somewhat less than the full weight of material desired, and means for transferring the receptacle from one load-receiving position to another.

2. An automatic weighing apparatus comprising two scales adapted to support a receptacle successively and adjusted to weigh slightly different loads, means for securing and controlling the delivery of material to said receptacle while on each scale, means for delivering a partial load of material to said receptacle prior to its reception upon the lesser-weight scale, and means for transferring the receptacle from one load-receiving position to another.

3. An automatic weighing apparatus comprising two scales adapted to support two receptacles simultaneously and each receptacle successively, said scales being adjusted to weigh slightly different loads, means for securing and controlling the delivery of material to the receptacles upon said scales, means for transferring said receptacles successively from the lesser-weight to the greater-weight scale, and means for delivering a partial load of material to each receptacle prior to its reception upon the lesser-weight scale.

4. An automatic weighing apparatus comprising three scales adapted to support a receptacle successively, means for delivering material to said receptacle while on each of the scales, means operative with the poising of each scale for cutting off the delivery of material thereto, said scales being adjusted to weigh progressively-increasing quantities of material, and means for transferring the receptacle from one load-receiving position to another.

5. An automatic weighing apparatus comprising three scales adapted to support a receptacle successively, means for delivering material to said receptacle while on each of the scales, means operative with the poising of each scale for cutting off the delivery of material thereto, said scales being adjusted to weigh progressively-increasing quantities of material, and means for transferring a receptacle to and from each of said scales in succession.

6. An automatic weighing apparatus comprising a series of scales each adapted to support a receptacle, means for securing and controlling the delivery of material thereto, tracks extending to and from each scale, and means for feeding receptacles along said track comprising a plurality of arms and devices for intermittently operating the same, said arms being adjustable in the direction of movement of the receptacles.

7. An automatic weighing apparatus comprising three scales arranged in series and adapted to support a receptacle successively, means for delivering material to the receptacle while on each of the scales, means operative with the poising of each scale for cutting off the delivery of material thereto, said scales being adjusted to weigh progressively-increasing quantities of material, and intermittently-operated feeding devices arranged to transfer receptacles to said scales simultaneously.

8. An automatic weighing apparatus comprising a substantially circular track, a series of scales located at intervals along said track and adapted to receive receptacles successively, means for delivering material to said receptacles while on the scales, means operative with the poising of each scale for cutting off the delivery of material thereto, and means for feeding the receptacles along said track comprising a rotatable feed plate and a series of arms carried thereby and extending over the track, each of said arms being laterally adjustable at its outer end.

9. An automatic weighing apparatus comprising a scale adapted to support a receptacle and means for securing and controlling the delivery of material thereto, a fixed track leading to the scale, means for moving a receptacle along the track and transferring it to said scale, and means for subsequently effecting a movement of the receptacle out of contact with said transferring means.

10. An automatic weighing apparatus comprising a scale and a receptacle support carried thereby, a fixed track leading to the receptacle support, means for moving a receptacle along the track and transferring it to said support, and means for subsequently effecting a movement of the receptacle support away from said transferring means.

11. An automatic weighing apparatus comprising a scale adapted to support a receptacle, means for securing and controlling the delivery of material thereto, means for transferring the receptacle to said scale, and means carried by said scale and arranged to be operated by the weight of the receptacle for moving said receptacle out of contact with said transferring means.

12. An automatic weighing apparatus comprising a scale, means for securing and controlling the delivery of material thereto, a receptacle support carried by said scale and arranged to be operated by the weight of the receptacle for moving the latter out of contact with said transferring means, means for transferring the receptacle to said support, and means for locking said support in elevated position during the transfer of the receptacle thereto.

13. An automatic weighing apparatus comprising a scale adapted to support a receptacle and means for securing and controlling the delivery of material thereto, a fixed track leading to said scale, a track section carried by the scale in substantial alinement with said fixed track, said track section being mounted to fall downward and away from the latter, means for transferring a receptacle from the fixed track to the track section, and means for lifting said track section prior to the transferring of said receptacle thereto, and for subsequently permitting the downward and forward movement thereof.

14. An automatic weighing apparatus comprising a scale beam, upwardly-extending links pivoted thereto, track sections pivotally supported on said links, a fixed track leading to said track sections and means for feeding receptacles along the same, and means for moving said track sections toward and away from the fixed track.

15. An automatic weighing apparatus comprising a scale, a fixed track leading thereto, links pivoted to said scale and slanting upward and away from said track, track sections pivoted to the upper ends of said links, in substantial alinement with the fixed track, means for feeding receptacles along said track and onto said track sections, a rod arranged to engage and lift said track sections, and means for raising and lowering said rod.

16. An automatic weighing apparatus comprising a scale, a fixed track leading thereto, links pivoted to said scale and slanting upward and away from said track, track sections pivoted to the upper ends of said links, in substantial alinement with the fixed track, a block carried by said track sections and having a recess in its under face, means for feeding receptacles along said track and onto said track sections, a rod arranged to engage and lift said block and seat in the recess therein, means for raising said rod prior to the operation of the receptacle-feeding means, and means for subsequently lowering said rod.

17. An automatic weighing apparatus comprising a series of scales adapted to support a corresponding number of receptacles simultaneously and each receptacle successively, feeding devices for simultaneously transferring receptacles to said scales, and means for causing the receptacles on the scales to move away from said feeding devices after each operation of the latter.

18. An automatic weighing apparatus comprising a track and means for intermittently feeding a series of receptacles along the same, a series of scales included in said track and carrying independent track sections forming a part of the latter, each of said track sections being mounted to move forward and away from the adjacent fixed portion of the track leading thereto, and means for simultaneously lifting said track sections prior to the operation of the receptacle-feeding device and for subsequently lowering said track sections.

19. In an automatic weighing apparatus, the combination with weighing means and a track leading thereto, of means for intermittently feeding a series of receptacles along said track, and means for transferring receptacles to said track comprising a conveyer belt, a push plate reciprocating transversely across the same, a stop plate extending transversely across the belt adjacent to the push plate, a receptacle support leading from said belt to said track, and means for reciprocating said push plate.

20. In an automatic weighing apparatus, the combination with weighing means and a track leading thereto, of a conveyer belt and a receptacle support leading from one side of the same to said track, a fixed stop plate extending across and above said belt, a push plate adapted to reciprocate transversely across the belt, adjacent to said fixed stop plate, a supplementary stop plate carried by said push plate, and means for operating the latter.

21. An automatic weighing apparatus comprising weighing means adapted to receive a series of receptacles successively and a track leading to and from said weighing means, in combination with a series of arms extending over said track and means for intermittently moving said arms lengthwise of the track, means for placing a receptacle between each pair of arms, prior to the movement thereof, and means for removing filled receptacles comprising a conveyer belt extending transversely across one end of the track and in the path of movement of said arms.

22. An automatic weighing apparatus comprising a scale adapted to support a receptacle, a feed chute arranged to deliver material thereto, a self-closing valve controlling said feed chute, positively-operated mechanism for periodically transferring a receptacle to and from the scale and for periodically opening said valve, means for holding said valve in its open position, and means operative with the poising of the scale for releasing said valve.

23. An automatic weighing apparatus comprising a plurality of scales adapted to support a corresponding number of receptacles simultaneously and each receptacle successively, feed chutes arranged to deliver material to said receptacles and self-closing valves controlling the same, positively-operated mechanism for periodically opening said valves and for transferring receptacles to and from said scales, means for holding each valve in its open position, and means operative with the poising of each scale for releasing the corresponding valve.

24. An automatic weighing apparatus comprising a scale adapted to support a receptacle, feeding means for transferring a receptacle to and from the scale, a feed chute arranged to deliver material to said receptacle and a valve controlling the same, means for opening said valve and for retaining it in open position, means operative with the poising of the scale for releasing said valve, and supplementary means operative prior to said feeding means for effecting the closing of said valve.

25. An automatic weighing apparatus comprising a scale adapted to support a receptacle, feeding means for transferring a receptacle to and from the scale, a feed chute arranged to deliver material to said receptacle and a valve controlling the same, means for opening said valve, means for holding said valve in its open position comprising a latch, means operative with the poising of the scale for releasing said latch, and supplementary latch-releasing means operative independently of the scale and prior to the operation of said feeding means.

26. An automatic weighing apparatus comprising a series of scales arranged to support a corresponding number of receptacles simultaneously and each receptacle successively, feed chutes arranged to deliver material to said receptacles and valves controlling the same, means for opening said valves simultaneously, means operative with the poising of each scale for closing the corresponding valve, intermittently-operating means for transferring receptacles to said scales simuultaneously, and means for subsequently moving each of said receptacles out of contact with the transferring means.

27. An automatic weighing apparatus comprising a series of scales arranged to support a corresponding number of receptacles simultaneously and each receptacle successively, feed chutes arranged to deliver material to said receptacles and valves controlling the same, means for opening said valves simultaneously, means operative with the poising of each scale for closing the corresponding valve, intermittently-operating means for transferring receptacles to said scales simultaneously, means for subsequently moving each of said receptacles out of contact with the transferring means, and supplementary means for causing the closing of said valves, independently of the poising of the scales.

28. An automatic weighing apparatus comprising a plurality of scales arranged to support a corresponding number of receptacles simultaneously, feeding devices for simultaneously transferring receptacles to and from said scales, feed chutes arranged to deliver material to the receptacles while on the respective scales and valves controlling said chutes, means for simultaneously opening said valves, means operative with the poising of each scale for causing the closing of the corresponding valve, and supplementary means for effecting the closing of said valves, independently of the poising of said scales.

29. An automatic weighing apparatus comprising a plurality of scales adapted to support a corresponding number of receptacles simultaneously, feeding devices for transferring receptacles to and from said scales simultaneously, feed chutes arranged to deliver material to the receptacles while on the respective scales and valves controlling said chutes, means for opening said valves, means for retaining the valves in open position comprising latch arms, means operative with the poising of each scale for tripping the corresponding latch arm, and supplementary means for simultaneously tripping said latch arms, independently of the poising of said scales.

30. An automatic weighing apparatus comprising a scale, a feed chute arranged to supply material thereto and a valve controlling said chute, means for opening said valve, a latch for holding the valve in open position, and means operative with the poising of the scale for releasing the valve, comprising a lever, a latch arm carried thereby, a tripping device for the valve latch and connections between the same and said lever, an abutment carried by the scale in position to engage and lift the latch arm when the scale beam poises, and means for resetting said latch arm.

31. An automatic weighing apparatus comprising a plurality of scales and means for transferring receptacles to and from the same simultaneously, feed chutes for said scales and valves controlling the same, means for opening said valves, latches for holding the valves in open position, means for tripping each of said latches comprising a lever, a latch arm carried thereby, a tripping device for the valve latch and connections between the same and said lever, an abutment carried by the scale in position to trip said latch arm when the scale beam poises, and means for resetting said latch arms simultaneously and permitting the independent tripping thereof.

32. An automatic weighing apparatus comprising a plurality of scales and means for transferring receptacles to and from the same simultaneously, feed chutes for said scales and valves controlling the same, means for opening said valves, latches for holding said valves in open position, means for tripping each of said latches comprising a lever, a latch arm carried thereby, a tripping device for the valve latch and connections between the same and said lever, an abutment carried by the scale in position to trip said latch arm when the scale beam poises, means for setting said latch arms simultaneously and permitting the independent tripping thereof, and supplementary means for simultaneously tripping said latch arms independently of the poising of the scale.

33. An automatic weighing apparatus comprising a scale, a feed chute for delivering material thereto and a valve controlling said feed chute, in combination with means for opening said valve, a latch for holding the valve in open position, a tripping device for said latch, and means for operating said tripping device comprising a rock shaft, a lever journaled thereon, connections between said lever and the tripping device, a latch arm carried by said lever and means operative with the poising of the scale for tripping the same, an arm carried by the rock shaft and provided with an abutment located in position to engage said lever and re-set the latch arm, and means for operating said rock shaft.

34. An automatic weighing apparatus comprising a plurality of scales, feed chutes for delivering material thereto and valves controlling said feed chutes, in combination with means for opening said valves, latches for holding the valves in open position, tripping devices for said latches, means for operating each of said tripping devices comprising a rock shaft, a lever journaled thereon, connections between said lever and the tripping device, a latch arm carried by said lever and means operative with the poising of the corresponding scale for tripping the same, an arm carried by the rock shaft and provided with an abutment located in position to engage said lever and re-set its latch arm, means for operating one of said rock shafts, and connections between the latter rock shaft and the other rock shafts permitting independent movement of the latter upon the tripping of the corresponding latch arms.

35. An automatic weighing apparatus comprising a series of scales, fixed track sections leading to and from said scales in series, movable track sections for each scale forming continuations of the fixed track sections and supported on their respective scales by means of upwardly and forwardly extending pivotal links, intermittently-operating means for feeding receptacles along said track, vertically movable arms arranged to engage and lift said movable track sections, means for raising and lowering said arms simultaneously, feed chutes for delivering material to the respective scales and valves controlling the same, means for simultaneously opening said valves after each operation of the receptacle-feeding means, means for effecting the closing of said valves comprising a latch arm and an abutment carried by the corresponding scale in position to trip said latch arm, means for simultaneously resetting said latch arms, and supplementary means for tripping said latch arms comprising upwardly-movable abutments carried by the arms which operate the movable track sections, substantially as described.

In testimony whereof, I have hereunto subscribed my name this ninth day of November, 1906.

EDWARD G. TREMAINE.

Witnesses:
HARRY D. BOWMAN,
MILTON H. BERTRAM.